Figure 1:
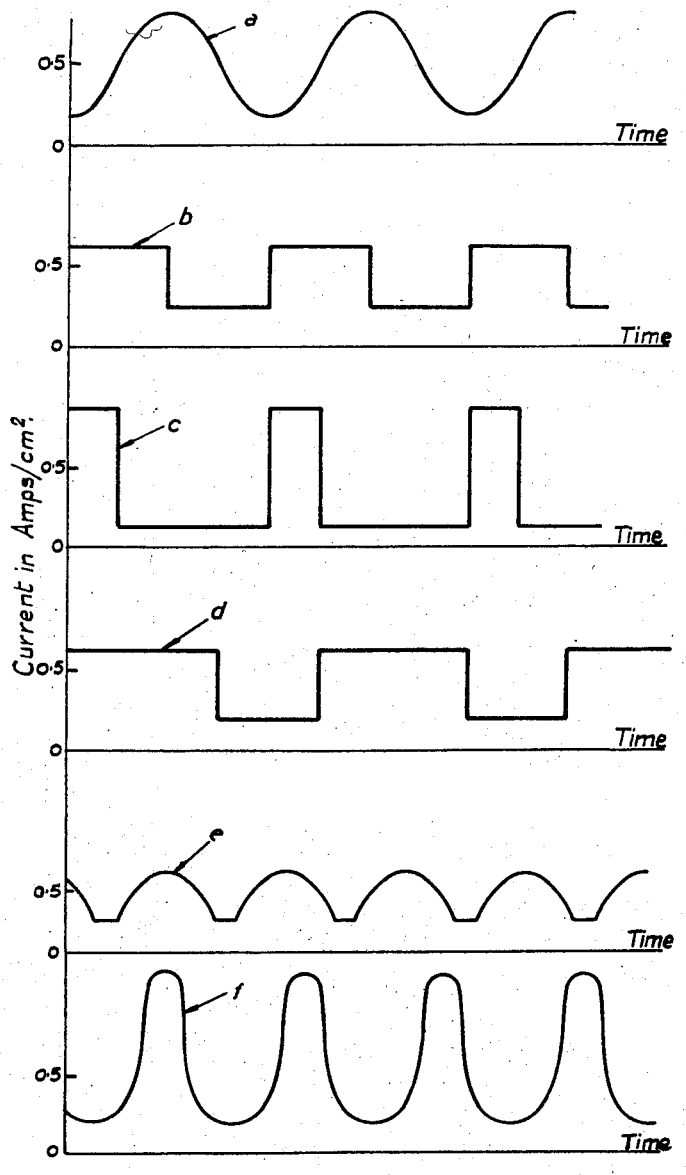

United States Patent Office 2,930,741
Patented Mar. 29, 1960

2,930,741

ELECTROLYTIC CAPACITORS

Francis Joseph Peter Julius Burger, Toronto, Ontario, Canada, and Victor Frederick George Tull, South Harrow, England Continuation of application Serial No. 288,984, May 20, 1952. This application December 19, 1957, Serial No. 704,859

Claims priority, application Great Britain June 19, 1951

10 Claims. (Cl. 204—141)

This invention relates to electrolytic capacitors of the kind which include an electrode of aluminium or aluminium alloy usually though not necessarily in the form of a foil, on the surface of which is an electrolytically formed dielectric film of oxide. The capacitance of such a capacitor depends on the area of filmed electrode surface in contact with the electrolyte between it and the complementary electrode or electrodes and proposals have been made to raise the capacitance by increasing the surface area of the electrode by roughening a surface of the electrode mechanically and/or by a chemical or electro-chemical etching process, before filming it.

For the purpose of increasing the surface area of such an electrode electrolytic etching processes using smooth or substantially smooth direct current have been proposed and etching processes involving the application of alternating current have been suggested. By adopting one or other of these processes it is possible to obtain considerable increase in capacitance. This increase may be expressed as the ratio of the capacitance at a given forming voltage of a filmed electrode having an etched surface to the capacitance at the same forming voltage of a similarly filmed smooth-surfaced electrode of the same nominal size and shape. This ratio we term the electrical magnification. With some of these proposed methods of electrolytically etching aluminium electrodes it is possible to produce electrical magnifications of about 10 in cases where the forming voltage does not exceed 100 volts but, as far as the applicants are aware, it has not hitherto been possible when forming voltages are in the region of 500 volts, to obtain by any of the known electrolytic etching processes an electrical magnification greater than about 4 with foils of 4 mils thickness, such figure being based on capacitance measurements made when the electrodes are immersed in an aqueous electrolyte consisting of a solution of ammonium borate and boric acid of the type commonly used for "forming" purposes.

If however the capacitance values are measured when the electrodes are immersed in a viscous "working" electrolyte consisting, for instance, of a solution of ammonium borate and boric acid in ethylene glycol such as is widely used in electrolytic capacitors of the so-called "dry" type, rather lower capacitance values are observed in the case of electrodes electrolytically etched by known methods, with the result that the electrical magnification is lower.

We have now discovered that electrical magnifications which are substantially higher than those indicated above can be obtained by using in the process of electrolytically etching the electrode of aluminium or aluminium alloy before filming it, a pulsating direct current having an appropriate degree of pulsation as hereinafter defined.

This application is a continuation of our application Serial No. 288,984, filed May 20, 1952, and now abandoned.

By a pulsating direct current we mean a unidirectional uninterrupted current of which the magnitude fluctuates periodically and by the term "degree of pulsation" we mean the total current swing expressed as a percentage of the average current value, i.e., the ratio between the maximum current variation and the average value expressed as a percentage.

We have found that, other factors being constant for a given average current the depth of the etch pits increases with the degree of pulsation and a high degree of pulsation favours the production of deep etch pits.

The degree of pulsation of the current that may be used in order to obtain an etched and formed electrode having a magnification factor at 500 volts forming voltage substantially higher than that resulting from known electrolytic etching processes in which substantially smooth direct current is used depends upon the "wave" form, frequency and average density of the pulsating current used, the composition and concentration of the electrolyte, and upon the depth of penetration, which depth may be governed by the thickness of the electrode and the necessity of avoiding perforation.

In the accompanying drawings—

Figure 2:
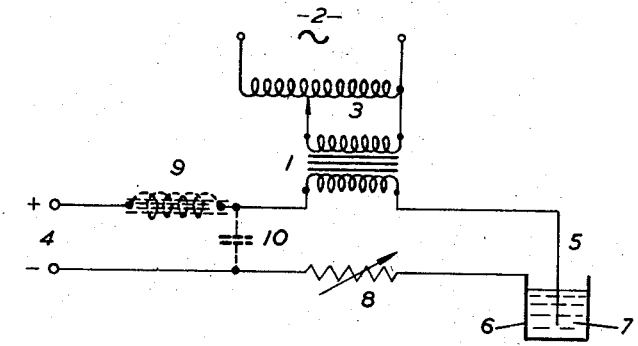
Figure 3:
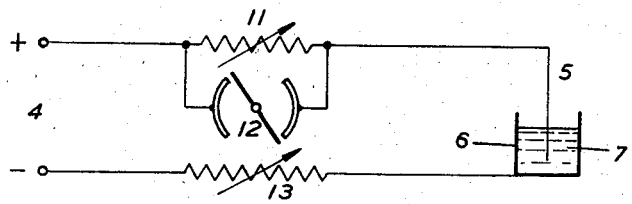
Figure 4:
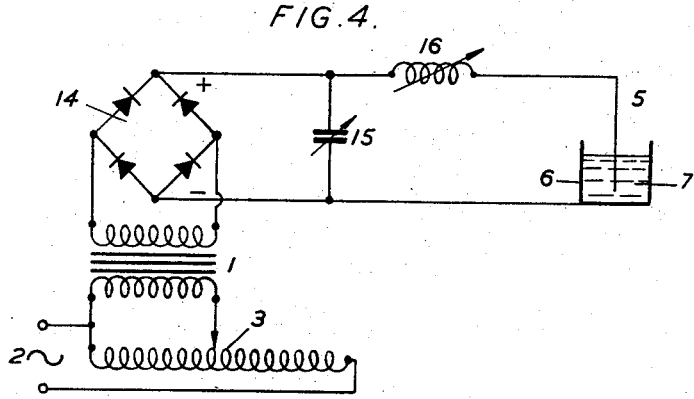
Figure 5:
Figure 6:
Figure 7:

Figure 1 comprises a number of time-current graphs of pulsating direct currents of various forms, Figures 2, 3 and 4 are circuit diagrams showing various forms of apparatus for the production of pulsating direct current and Figures 5, 6 and 7 are reproductions of photo-micrographs of cross-sections of various forms of etched foil.

It has been indicated that by pulsating direct current we mean a uni-directional uninterrupted current of which the magnitude fluctuates periodically. The nature of the pulsations may vary considerably. Examples of types of pulsating current that have been found to be satisfactory are shown in Figure 1 of the accompanying drawings where curve $a$ is a time-current graph of a pulsating current in which the pulsations are of sine wave form. It may be obtained for instance by injecting alternating current of sine wave form into a smooth direct current supply. This may be done, as shown in Figure 2, by means of a transformer 1 fed from a source of A.C. supply 2 through a voltage regulator 3 and having its secondary winding in series with a direct current circuit extending from a source of D.C. supply 4 to the aluminium anode 5 and cathode 6 of an etching bath 7, a regulating resistance 8 preferably being inserted in the circuit and a choke 9 and by-pass capacitor 10 being introduced if required. Curve $b$ of Figure 1 is a corresponding graph of a pulsating direct current of square topped wave form in which the duration of the individual peaks is equal to the duration of the interval between them, curve $c$ a graph of a pulsating direct current of square topped wave form in which the duration of the individual peaks is much less than the time interval between them and curve $d$ a graph of a pulsating direct current of square topped wave form in which the duration of the individual peaks exceeds the time interval between them. Pulsating current of these three wave forms may be obtained, as shown in Figure 3, by inserting a variable resistance 11 in series in a circuit extending from a source of D.C. supply 4 to the anode 5 and cathode 6 of the etching bath 7 and providing a power driven rotary switch 12 having contacts of appropriate arcuate lengths for short circuiting the resistance 11 periodically. A voltage regulator is shown at 13. Instead of by a rotary switch 12, periodic short circuiting of the resistance 11 may be effected by means of a thyratron type of control triggered periodically as by a capacitor-controlled timing device. Curve $e$ is a time-current graph of a pulsating direct current of rounded topped wave form obtained from apparatus of the kind shown in Figure 4 and comprising a full wave rectifier 14 fed from a source of A.C. supply 2 through a regulator 3 and a transformer 1. The rectifier 14 feeds the etching bath electrodes 5 and 6 through an adjustable smoothing net-work comprising a variable capacitor 15 and/or a variable choke 16 so that the ripple on the output current can be appropriately controlled. Curve $f$ of Figure 1 is a time-current graph of a pulsating direct current of a wave form having more pronounced peaks than that indicated by curve $e$. It is approximately of rectangular wave form and is obtained by full-wave rectification of alternating current of which the wave form differs substantially from that of a true sine wave and an appropriate degree of smoothing. Other appropriate forms of pulsating direct current may be found by experiment bearing in mind that the essential characteristics appear to be a high degree of pulsation combined with a relatively small but still substantial uninterrupted flow of current throughout the intervals between pulses. Here it is mentioned that unsmoothed rectified current obtained from 3-phase alternating current of sine wave form is not suitable, for the degree of pulsation (15.3 for half-wave rectification) is too low and that unsmoothed rectified current obtained from single-phase alternating current of sine wave form is also unsuitable for even with full wave rectification the degree of pulsation is 157% which has been found too high for that wave form to give an etch which will yield a high electrical magnification, or in other words, the minimum value of the current between pulses is too low.

The degree of pulsation that may be employed to obtain commercially useful results will be found within the range of 50 to 200% for pulsating current of sine wave form such as is illustrated by curve $a$ in Figure 1 but for current of the square wave form shown by curve $b$ the useful range is rather more limited being from 80% to 195% and for current of the form shown by curve $c$ the range is from 80% to 250% or more depending upon the duration of the individual pulses compared with the duration of the intervals between successive pulses—the shorter the pulses, the higher the degree of pulsation permissible. For partially smoothed full-wave rectified single phase alternating current (curve $e$) the range is more limited being from 80 to 150%. The useful ranges for pulsating direct current of other wave forms may readily be determined experimentally.

The frequency of pulsation may vary within fairly wide limits ranging from a few cycles per second to 2000 cycles per second but the preferred range is from 50 to about 250 cycles per second.

The average current density of the pulsating current is limited in practice by the violence of the gas and heat evolution accompanying the etching process. For economic reasons we prefer to work near to this upper limit which will, of course, be dependent upon the foil being etched and the design of plant employed, in particular upon the facilities for removal at such a rate as to avoid overheating of the foil, of the heat generated in the etching bath.

Concerning the composition and concentration of the electrolyte, it is explained that the electrolyte must conform to the following conditions:

(1) The purely chemical attack which it exerts on the electrode must be small so that the characteristics of the etch produced can be effectively controlled by the electrical conditions.

(2) It must not be unduly modified or decomposed due either directly or indirectly to the passage of the current through it.

(3) It must not result in the formation of a high resistance anodic film on the electrode to be etched.

Examples of electrolytes conforming to these conditions, hereinafter referred to as electrolytes of the type described, that have been found to be suitable are chlorides, chlorates, bromides and iodides of sodium, potassium and ammonium. Of these we prefer sodium chloride on account of its cheapness. Electrolytes which are known not to be satisfactory for etching processes involving the use of smooth direct current should not be used for the present process. The concentration of the electrolyte should be kept as low as possible. In practice the lower limit is set by the low electrical conductivity of very dilute solutions which gives rise to excessive heat generation. A satisfactory concentration is 0.1 to 0.2 N, concentrations which are much higher than 2 N being unsuitable.

The depth of penetration permissible will naturally be governed by the thickness of the foil or other body constituting the electrode to be etched. It will generally be advantageous to make it as great as is possible without causing perforation. The duration of the etching process will therefore depend upon the thickness of the foil other conditions being constant and optimum times may readily be determined experimentally for each electrode.

The degree of pulsation required to give the highest or any other value of electrical magnification will be dependent upon the other parameters mentioned and may be determined experimentally. A convenient procedure in as follows:

A cheap and readily available electrolyte is chosen, for example 0.2 N NaCl solution. A pulsating current of appropriate wave form and frequency is selected according to the electrical plant available. The current density is made as high as is convenient for the particular etching machine to be employed to carry out the process. The etching time is chosen to allow the maximum amount of metal to be removed without risk of perforation. Having fixed all the foregoing factors it then remains to carry out a series of tests with different degrees of pulsation to determine which will give the highest electrical magnification. This experimental determination is considerably assisted by visual examination of the etched foil (or other body). If the degree of pulsation is too low, the etched foil will have a dark grey appearance, the whole surface having been attacked. If the degree of pulsation is too high, the etched foil will appear fairly bright, a considerable proportion of the surface remaining unattacked. The foil will be perforated at many of the places where an attack has taken place. If the correct degree of pulsation has been chosen, the whole surface of the foil will have been attacked but there will be no perforation and the foil will be of light grey appearance. A more accurate estimate of the magnification factor is obtained by taking a cross-section of the etched foil and viewing it through a microscope. Figures 5, 6, and 7 show photomicrographs of such cross-sections. The foil shown in Figure 5 having been etched with smooth direct current, that shown in Figure 6 having been etched with pulsating direct current in which the degree of pulsation was too high for the current density, wave form, frequency and type of electrolyte used, and that shown in Figure 7 having been etched with pulsating direct current in which the degree of pulsation was correct for the current density, wave form, frequency and electrolyte used—the conditions being as specified in Example 6 given hereinafter. If it is found that the degree of pulsation is too high or too low it may either be reduced or increased accordingly. Alternatively, since with increasing frequency of pulsation the value for the optimum degree of pulsation drops, with increasing current density the value of the optimum degree of pulsation increases and with increasing foil thickness the degree of pulsation and etching time may be increased, the degree of pulsation may be maintained at the same value and one or more of the other parameters mentioned may be varied in an appropriate direction until the degree of pulsation chosen yields an etched foil of the required high electrical magnification. If parts of the surface of the foil remain unattacked, it may be necessary to increase the average current density of the pulsating etching current. The following examples of etching methods in accordance with the invention, namely Examples 2-15 are given to illustrate the excellent results obtainable and to enable the invention to be carried out without the need to determine experimentally the various parameters required to obtain etched aluminium foils which when formed at 500 volts yield electrical magnifications substantially higher than those obtained as a result of etching by the known electrolytic etching processes in which substantially smooth direct current is used. Example 1 is an example of a method of etching by smooth direct current and is included for purposes of comparison.

The electrical magnifications hereinbefore quoted are obtained when the etched and subsequently anodically formed foils are immersed in aqueous electrolyte. When the etched and formed foils are used for viscous working electrolytes the magnifications are reduced by about 10–25%. It will be seen that in all the examples of etching in accordance with the invention the electrical magnifications obtained are substantially higher than can be obtained by etching with smooth direct current and in most cases are more than twice as high. It is stressed that in all the examples the electrical magnifications quoted are those obtained when the etched foils are anodically formed at 500 volts forming voltage and it is

| Example No. | Current Source | Wave Form | Frequency, c/s. | Degree of Pulsation, Percent | Aqueous Electrolyte | Electrical Magnification at 500 v. forming voltage |
|---|---|---|---|---|---|---|
| 1 | Smooth D.C. | | | | 0.21 N NaCl / 0.01 N HCl | 3.7 |
| 2 | D.C. and Transformer (Fig. 2 arrangt.). | Sine | 50 | 160 | 0.21 N NaCl / 0.01 N HCl | 8.2 |
| 3 | ----do---- | ----do---- | 1,140 | 80 | 0.21 N NaCl / 0.01 N HCl | 5.2 |
| 4 | ----do---- | ----do---- | 2,000 | 65 | 0.21 N NaCl / 0.01 N HCl | 4.8 |
| 5 | D.C. and Switch (Fig. 3 arrangt.). | Square | 10 | 140 | 0.21 N NaCl / 0.01 N HCl | 5.5 |
| 6 | ----do---- | ----do---- | 130 | 170 | 0.11 N NaCl / 0.005 N HCl | 12.4 |
| 7 | ----do---- | ----do---- | 130 | 160 | 0.21 N NaCl / 0.01 N HCl | 8.7 |
| 8 | ----do---- | ----do---- | 130 | 180 | 0.68 N NaCl | 6.9 |
| 9 | ----do---- | ----do---- | 130 | 180 | 0.2 N $NH_4Cl$ | 8.0 |
| 10 | ----do---- | ----do---- | 130 | 180 | 0.2 N KBr | 7.8 |
| 11 | ----do---- | ----do---- | 130 | 140 | 0.2 N KI | 7.8 |
| 12 | ----do---- | ----do---- | 130 | 180 | 0.2 N $KClO_3$ | 8.2 |
| 13 | ----do---- | ----do---- | 200 | 140 | 0.21 N NaCl / 0.01 N HCl | 9.7 |
| 14 | Single phase rectifier+choke (Fig. 4 arrangt.). | Curve | 100 | 140 | 0.21 N NaCl / 0.01 N HCl | 8.3 |
| 15 | Fig. 3 arrangt. but with pulse period 24% of cycle. | Rectangular | 130 | 250 | 0.21 N NaCl / 0.01 N HCl | 7 |

The results quoted were obtained with 99.8% purity aluminium foil except in the case of Example 7 where a "super purity" grade of foil was used but foils of other degrees of purity may be used. In all cases the initial foil thickness was 0.004 inch but naturally the invention is not limited in this respect. In all cases too the mean current density of the etching current was 0.5 amps./cm.$^2$ and the duration of etching was two minutes twenty-four seconds. The etching temperature was near the boiling point of the electrolyte.

Generally it is the practice of manufacturers of electrolytic capacitors having etched aluminium foil electrodes to prepare the aluminium foil for etching by heat-treating it and/or by degreasing it and removing oxide or other contaminating surface layers by treatment with a solution of caustic soda or other appropriate chemical reagent. The same practice will generally be adopted in connection with our improved process of etching as applied to aluminium or aluminium alloy foil unless the condition of the foil is such as to render one or more of such treatments unnecessary. An indication whether a pre-etching treatment is necessary is obtained by subjecting a sample of the foil as received from the supplier to a D.C. etching process such as is specified in Example 1. Unless it results in a feathery etch of the whole surface of the kind shown in Figure 5, a pre-etching treatment should be given to the remainder of the foil before subjecting it to a pulsating direct current etching process according to the invention. It will be appreciated that the precise nature of the pre-etching treatment, if one is needed, will depend upon the condition of the foil as received from the supplier. A pre-etching treatment which has been found to be satisfactory in many cases and to which all the foils of Examples 1–15 were subjected, consists in first heat treating the foil at 600° C. for two hours and then pre-cleaning the foil by immersion for two minutes at 90° C. in a 0.02 N solution of caustic soda.

pointed out that if lower forming voltages are used higher magnifications may be measured and if higher forming voltages are used lower magnifications may be measured. The forming voltage of 500 volts, to which reference is made here and elsewhere in the specification and in the claims, has been selected merely as a convenient standard to be used in the experimental determination of the increase in capacitance of an anodically formed, etched body of aluminium or aluminium alloy that results from subjecting it to an electrolytic etching process. Accordingly a reference to this particular forming voltage of 500 volts in the statement of claims is not to be construed as implying that the invention claimed is restricted to the production of etched bodies of aluminium or aluminium alloy that are to be or have been anodically formed at 500 volts forming voltage.

What we claim as our invention is:

1. A method of preparing a foil of the group consisting of aluminum and anodically film forming alloys thereof and suitable for use in the manufacture of electrolytic capacitors, comprising electrolytically etching its surface by preparing an electrolytic etching solution, dipping the foil in the solution, and applying between the foil and the electrolyte a pulsating direct voltage to produce between the foil and the electrolyte a pulsating but uninterrupted current having a degree of pulsation within the range of 50% to 250% and a frequency of pulsation less than 2,000 cycles per second.

2. A method of preparing a foil of the group consisting of aluminum and anodically film forming alloys thereof and suitable for use in the manufacture of electrolytic capacitors, comprising electrolytically etching its surface by preparing an electrolytic etching solution, dipping the foil in the solution, and applying between the foil and the electrolyte a pulsating but uninterrupted direct current of approximately sine wave form having a degree of pulsation within the range 50% to 200% and a frequency of pulsation less than 2,000 cycles per second.

3. A method of preparing a foil of the group consisting of aluminum and anodically film forming alloys thereof and suitable for use in the manufacture of electrolytic capacitors, comprising electrolytically etching its surface by preparing an electrolytic etching solution, dipping the foil in the solution, and applying between the foil and the electrolyte a pulsating but uninterrupted direct current of approximately square wave form having a degree of pulsation within the range 80% to 195% and a frequency of pulsation less than 2,000 cycles per second.

4. A method of preparing a foil of the group consisting of aluminum and anodically film forming alloys thereof and suitable for use in the manufacture of electrolytic capacitors, comprising electrolytically etching its surface by preparing an electrolytic etching solution, dipping the foil in the solution, and applying between the foil and the electrolyte a pulsating but uninterrupted direct current of approximately rectangular wave form with peaks having each a duration substantially less than the duration of the interval between two successive peaks, the degree of pulsation of said current being at least 80% and a frequency of pulsation less than 2,000 cycles per second.

5. A method of preparing a foil of the group consisting of aluminum and anodically film forming alloys thereof and suitable for use in the manufacture of electrolytic capacitors, comprising electrolytically etching its surface by preparing an electrolytic etching solution, dipping the foil in the solution, and applying between the foil and the electrolyte a pulsating but uninterrupted direct current of rounded topped wave form as obtained by rectifying and partially smoothing mains alternating current, the degree of pulsation of said pulsating current being within the range 80% to 150% and a frequency of pulsation less than 2,000 cycles per second.

6. A foil of the group consisting of aluminum and anodically film forming alloys thereof and suitable for use in the manufacture of electrolytic capacitors and manufactured by the process which comprises electrolytically etching its surface by preparing an electrolytic etching solution, dipping the foil in the solution, and applying between the foil and the electrolyte a pulsating direct voltage to produce between the foil and the electrolyte a pulsating but uninterrupted current having a degree of pulsation within the range 50% to 250% and a frequency of pulsation less than 2,000 cycles per second.

7. A foil of the group consisting of aluminum and anodically film forming alloys thereof and suitable for use in the manufacture of electrolytic capacitors and manufactured by the process which comprises electrolytically etching its surface by preparing an electrolytic etching solution, dipping the foil in the solution, and applying between the foil and the electrolyte a pulsating but uninterrupted direct current of approximately sine wave form having a degree of pulsation within the range 50% to 200% and a frequency of pulsation less than 2,000 cycles per second.

8. A foil of the group consisting of aluminum and anodically film forming alloys thereof and suitable for use in the manufacture of electrolytic capacitors and manufactured by the process which comprises electrolytically etching its surface by preparing an electrolytic etching solution, dipping the foil in the solution, and applying between the foil and the electrolyte a pulsating but uninterrupted direct current of approximately square wave form having a degree of pulsation within the range 80% to 195% and a frequency of pulsation less than 2,000 cycles per second.

9. A foil of the group consisting of aluminum and anodically film forming alloys thereof and suitable for use in the manufacture of electrolytic capacitors and manufactured by the process which comprises electrolytically etching its surface by preparing an electrolytic etching solution, dipping the foil in the solution, and applying between the foil and the electrolyte a pulsating but uninterrupted direct current of approximately rectangular wave form with peaks having each a duration substantially less than the duration of the interval between two successive peaks, the degree of pulsation of said current being at least 80% and a frequency of pulsation less than 2,000 cycles per second.

10. A foil of the group consisting of aluminum and anodically film forming alloys thereof and suitable for use in the manufacture of electrolytic capacitors and manufactured by the process which comprises electrolytically etching its surface by preparing an electrolytic etching solution, dipping the foil in the solution, and applying between the foil and the electrolyte a pulsating but uninterrupted direct current of rounded topped wave form as obtained by rectifying and partially smoothing mains alternating current, the degree of pulsation of said pulsating current being within the range 80% to 150% and a frequency of pulsation less than 2,000 cycles per second.

References Cited in the file of this patent

UNITED STATES PATENTS

| | | |
|---|---|---|
| 1,388,874 | Mershon | Aug. 30, 1921 |
| 1,735,509 | Setoh et al. | Nov. 12, 1929 |
| 2,372,599 | Nachtman | Mar. 27, 1945 |
| 2,699,382 | Altenpohl | Jan. 11, 1955 |
| 2,755,237 | Turner | July 17, 1956 |

FOREIGN PATENTS

| | | |
|---|---|---|
| 393,565 | Great Britain | 1933 |
| 467,024 | Great Britain | June 9, 1937 |

UNITED STATES PATENT OFFICE
CERTIFICATE OF CORRECTION

Patent No. 2,930,741                                            March 29, 1960

Francis Joseph Peter Julius Burger et al.

It is hereby certified that error appears in the above numbered patent requiring correction and that the said Letters Patent should read as corrected below.

In the grant, lines 1, 2, and 3, for "Francis Joseph Peter Julius Burger, of Toronto, Ontario, Canada, and Victor Frederick George Tull, of South Harrow, England," read -- Francis Joseph Peter Julius Burger, of Toronto, Ontario, Canada, and Victor Frederick George Tull, of South Harrow, England, assignors to British Dielectric Research Limited, of London, England, a British company, --; lines 12 and 13, for "Francis Joseph Peter Julius Burger and Victor Frederick George Tull, their heirs" read -- British Dielectric Research Limited, its successors --; in the heading to the printed specification, lines 3, 4, and 5, for "Francis Joseph Peter Julius Burger, Toronto, Ontario, Canada, and Victor Frederick George Tull, South Harrow, England" read -- Francis Joseph Peter Julius Burger, Toronto, Ontario, Canada, and Victor Frederick George Tull, South Harrow, England, assignors to British Dielectric Research Limited, London, England, a British company --.

Signed and sealed this 29th day of November 1960.

(SEAL)
Attest:
KARL H. AXLINE
Attesting Officer

ROBERT C. WATSON
Commissioner of Patents